US012617640B2

(12) United States Patent
Saito et al.

(10) Patent No.: US 12,617,640 B2
(45) Date of Patent: May 5, 2026

(54) SHEET FEEDER, IMAGE FORMING APPARATUS, AND NON-TRANSITORY COMPUTER READABLE MEDIUM

(71) Applicant: FUJIFILM Business Innovation Corp., Tokyo (JP)

(72) Inventors: Joji Saito, Kanagawa (JP); Makoto Ito, Kanagawa (JP); Haruhiko Kojima, Kanagawa (JP); Ai Nakao, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/182,732

(22) Filed: Mar. 13, 2023

(65) Prior Publication Data

US 2024/0092597 A1 Mar. 21, 2024

(30) Foreign Application Priority Data

Sep. 16, 2022 (JP) ................................ 2022-148542

(51) Int. Cl.
*B65H 7/20* (2006.01)
*G06K 15/16* (2006.01)

(52) U.S. Cl.
CPC ............... *B65H 7/20* (2013.01); *G06K 15/16* (2013.01); *B65H 2557/23* (2013.01)

(58) Field of Classification Search
CPC . G06K 15/16; B65H 1/00; B65H 1/04; B65H 5/00; B65H 7/20; B65H 2405/10; B65H 2405/35; B65H 2557/23
USPC ................................................ 271/9.01, 145
See application file for complete search history.

(56) References Cited

U.S. PATENT DOCUMENTS

| | | | | | |
|---|---|---|---|---|---|
| 7,303,187 | B2 * | 12/2007 | Shiho | B65H 7/20 399/81 |
| 9,375,961 | B2 * | 6/2016 | Hirai | G06F 3/1255 |
| 10,137,711 | B2 * | 11/2018 | Arai | B41J 13/0018 |
| 11,230,451 | B2 * | 1/2022 | Bhaskaran | G03G 15/6502 |
| 2008/0290583 | A1 * | 11/2008 | Kubo | G03G 15/6508 271/9.01 |
| 2020/0102179 | A1 * | 4/2020 | Lee | G06F 3/121 |
| 2021/0334611 | A1 * | 10/2021 | Kodama | G06K 15/4065 |

FOREIGN PATENT DOCUMENTS

| | | |
|---|---|---|
| JP | H04-255873 A | 9/1992 |
| JP | 2014-125318 A | 7/2014 |

OTHER PUBLICATIONS

Espacenet machine translation of JP2014125318A; https://translationportal.epo.org/emtp/translate/?ACTION=description-retrieval&COUNTRY=JP&ENGINE=google&FORMAT=docdb&KIND=A&LOCALE=en_EP&NUMBER=2014125318&OPS=ops.epo.org/3.2&SRCLANG=ja&TRGLANG=en (Year: 2014).*

* cited by examiner

*Primary Examiner* — Leslie A Nicholson, III
(74) *Attorney, Agent, or Firm* — Oliff PLC

(57) ABSTRACT

A sheet feeder includes: multiple sheet feeding trays each configured to house one or more print media sheets; and a processor configured to cause a sheet feeding tray assigned a top priority to feed a print media sheet after the sheet feeding tray is set up for sheet feeding and a state of the sheet feeding tray is fixed, the top priority being highest among priorities that are assigned to the multiple sheet feeding trays and that are determined in advance with regard to sheet feeding.

16 Claims, 10 Drawing Sheets

SHEET FEEDER, IMAGE FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-148542 filed Sep. 16, 2022.

BACKGROUND

(i) Technical Field

The present disclosure relates to a sheet feeder, an image forming apparatus, and a non-transitory computer readable medium.

(ii) Related Art

Japanese Unexamined Patent Application Publication No. 2014-125318 discloses a printer including multiple sheet feeding trays configured to house one or more print media sheets; an open/close detector configured to detect opening and closing of each of the sheet feeding trays; a sheet transport path configured to transport a print media sheet fed from each of the sheet feeding trays; a printing unit configured to print an image on a print media sheet transported along the sheet transport path; a priority memory unit configured to store the priority of each of the sheet feeding trays with regard to sheet feeding; a size memory unit configured to store the size of a print media sheet set for each of the sheet feeding trays; an acquiring unit configured to acquire the size of a print media sheet fed to the sheet transport path from each of the sheet feeding trays; and a controller, wherein the controller is configured to perform a determination process in which an execution tray that is one of the sheet feeding trays and that is to feed a print media sheet is determined in accordance with the priority, a setting process in which the size acquired by the acquiring unit for the print media sheet fed from the execution tray is saved to the size memory unit as the size of a print media sheet to be set for the execution tray, a changing process in which the top priority is assigned to a specific tray among the sheet feeding trays on condition that the open/close detector has detected opening and closing of the specific tray.

Japanese Unexamined Patent Application Publication No. 4-255873 discloses a disallowed tray method for an image recording apparatus including a setting unit for setting a tray of choice as a disallowed tray and a unit for causing an automatic sheet selection function and an automatic tray switching function to reflect the setting of the disallowed tray on condition that the disallowed tray has been set by the setting unit.

SUMMARY

Aspects of non-limiting embodiments of the present disclosure relate to controlling a sheet feeding tray to feed a sheet in comparison with the case where the priorities of multiple sheet feeding trays with regard to sheet feeding are changed based on the states of the sheet feeding trays.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet feeder including: a plurality of sheet feeding trays each configured to house one or more print media sheets; and a processor configured to cause a sheet feeding tray assigned a top priority to feed a print media sheet after the sheet feeding tray is set up for sheet feeding and a state of the sheet feeding tray is fixed, the top priority being highest among priorities that are assigned to the plurality of sheet feeding trays and that are determined in advance with regard to sheet feeding.

BRIEF DESCRIPTION OF THE DRAWINGS

Exemplary embodiments of the present disclosure will be described in detail based on the following figures, wherein.

DETAILED DESCRIPTION

Hereinafter, exemplary embodiments according to the present disclosure will be described with reference to the drawings.

First Exemplary Embodiment

Image Forming Apparatus 10

Figure 1:
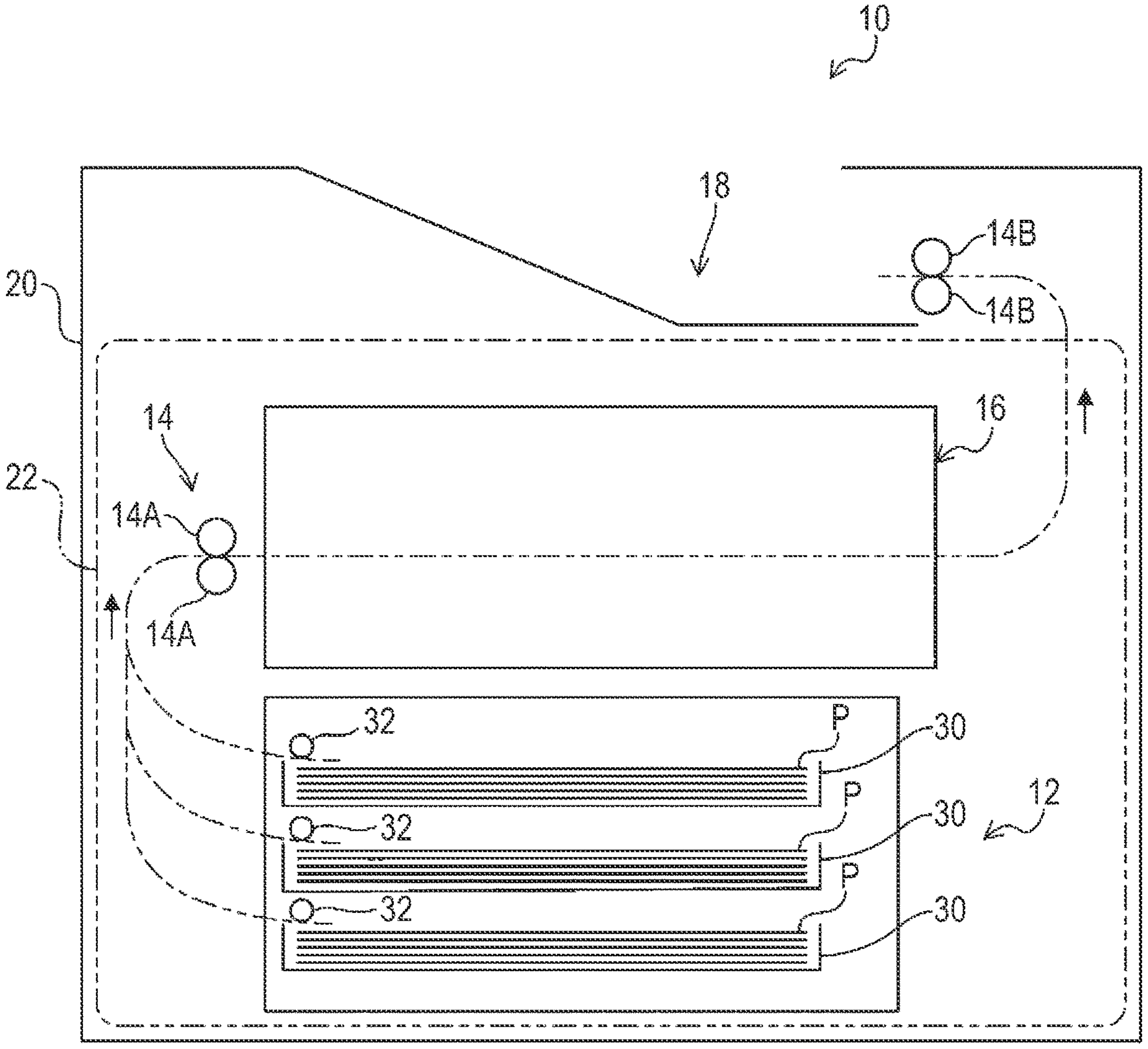
FIG. 1 is a diagram for describing a configuration of an image forming apparatus according to the first exemplary embodiment.

First, a configuration of an image forming apparatus 10 according to the first exemplary embodiment will be described. FIG. 1 is a schematic diagram depicting the configuration of the image forming apparatus 10 according to the present exemplary embodiment.

The image forming apparatus 10, which is depicted in FIG. 1, forms an image on a print media sheet P, which is an example of a recording medium. Specifically, as depicted in FIG. 1, the image forming apparatus 10 includes a sheet feeder 12, a transport unit 14, an image forming unit 16, and a discharge unit 18. Each unit of the image forming apparatus 10 will be described herein.

Sheet Feeder 12

The sheet feeder 12, which is depicted in FIG. 1, is configured to transfer out a print media sheet P in the image forming apparatus 10. In other words, the sheet feeder 12 is configured to supply (feed) a print media sheet P to the image forming unit 16. The sheet feeder 12 includes at least one sheet feeding tray 30 configured to house one or more print media sheets P. The at least one sheet feeding tray 30 is fitted with a feed roller 32 configured to transfer a print media sheet P placed uppermost in the sheet feeding tray 30 to the image forming unit 16 one by one. The at least one sheet feeding tray 30 is able to house a large number of print media sheets P of various kinds (kinds of paper) and varying dimensions (sizes). The sheet feeder 12 includes three sheet feeding trays 30 in the present exemplary embodiment.

Transport Unit 14

The transport unit 14, which is depicted in FIG. 1, is configured to transport a print media sheet P in the image forming apparatus 10. The transport unit 14 possesses the function of transporting to the image forming unit 16 a print media sheet P transferred out from the sheet feeder 12 and the function of transporting a print media sheet P on which an image is formed by the image forming unit 16 onto the discharge unit 18.

Specifically, the transport unit 14 includes transport members 14A and 14B, each of which is formed by a pair of transport rollers. In the transport unit 14, the transport member 14A is configured to transport to the image forming unit 16 a print media sheet P transferred out from the sheet feeder 12, and the transport member 14B is configured to transport a print media sheet P on which an image is formed by the image forming unit 16 onto the discharge unit 18.

Examples of the transport members 14A and 14B are not limited to a pair of transport rollers. Examples of the transport members 14A and 14B include transport members such as a transport belt and a transport drum and also include various kinds of transport members.

Image Forming Unit 16

The image forming unit 16, which is depicted in FIG. 1, is configured to form an image on a print media sheet P transferred out from the sheet feeder 12. Examples of the image forming unit 16 include an image forming unit of the inkjet type configured to form an image on a recording medium by using ink and an image forming unit of the electrophotographic type configured to form an image on a recording medium by using toner.

An image forming unit of the inkjet type is configured to form an image on a recording medium, for example, by causing a discharge unit to discharge ink drops to the recording medium. An image forming unit of the inkjet type may be configured to form an image on a recording medium by discharging ink drops from the discharge unit to a transfer body and transferring the ink drops from the transfer body to the recording medium.

An image forming unit of the electrophotographic type is configured to form an image on a recording medium, for example, by performing processes of charging, exposure, development, and transfer. An image forming unit of the electrophotographic type may be configured to form an image on a recording medium by performing processes of charging, exposure, development, and transfer to form an image on a transfer body and transferring the image from the transfer body to the recording medium.

Examples of the image forming unit are not limited to the image forming unit of the inkjet type and the image forming unit of the electrophotographic type, which are described above, and include image forming units of various types.

Discharge Unit 18

The discharge unit 18, which is depicted in FIG. 1, is configured to receive a recording medium on which an image is formed in the image forming apparatus 10. A print media sheet P is discharged onto the discharge unit 18 after the image forming unit 16 forms an image on the print media sheet P and the transport unit 14 (specifically, the transport member 14B) transports the print media sheet P.

The image forming apparatus 10 also includes a housing 20. The housing 20 houses the sheet feeder 12, the transport unit 14, and the image forming unit 16. The discharge unit 18 is disposed, for example, in the upper portion or on the side portion of the housing 20. The discharge unit 18 is disposed in the upper portion of the housing 20 in the present exemplary embodiment.

The housing 20 also includes an open/close covering 22. The open/close covering 22 forms a portion of the walls that form the housing 20. Opening the open/close covering 22 enables, for example, the sheet feeding trays 30 to be supplied with a print media sheet P in the sheet feeder 12. In addition, closing the open/close covering 22 enables the multiple sheet feeding trays 30 to be covered by the open/close covering 22 from outside. The open/close covering 22 forms a portion of the front wall of the housing 20 in the present exemplary embodiment, but the present disclosure is not limited to this configuration. For example, the open/close covering 22 may form a portion of the wall on the right-hand side, a portion of the wall on the left-hand side, or a portion of the back wall of the housing 20, or the open/close covering 22 may form the whole of any one wall of the housing 20.

Figure 2:
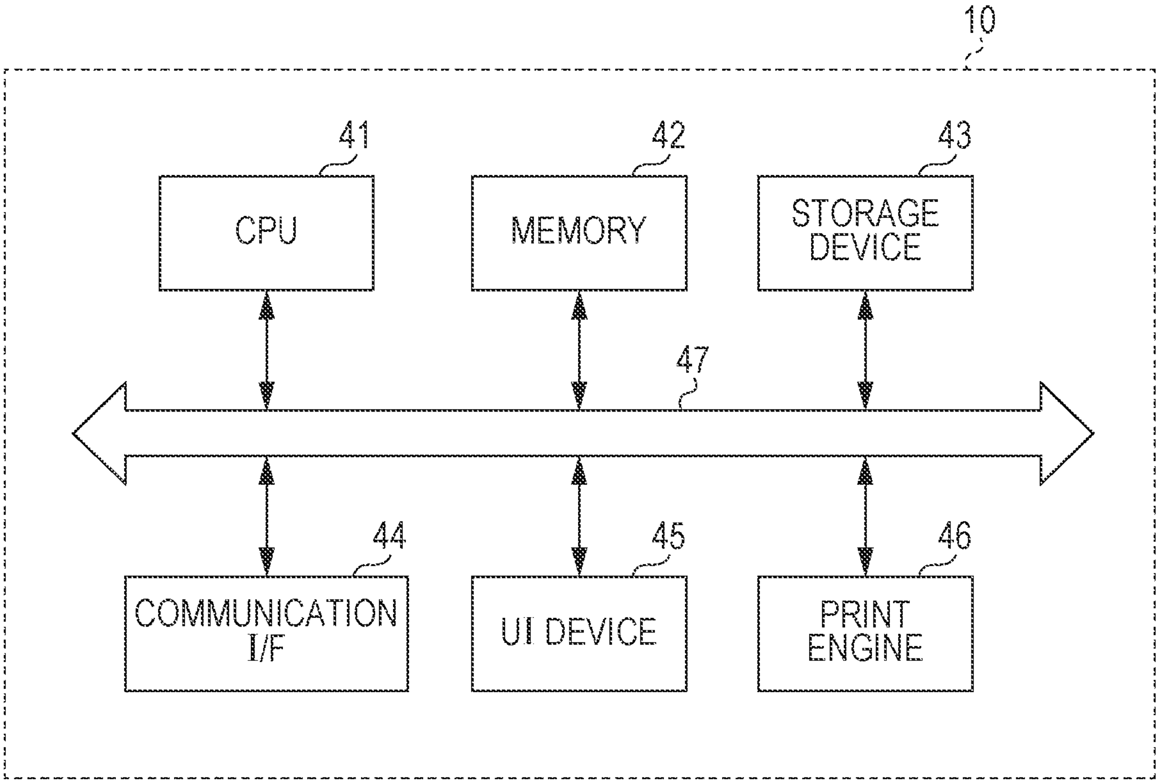
FIG. 2 is a block diagram depicting a hardware configuration of a control device included in the image forming apparatus according to the first exemplary embodiment.

Next, FIG. 2 depicts a hardware configuration of the image forming apparatus 10 according to the present exemplary embodiment.

As depicted in FIG. 2, the image forming apparatus 10 includes a central processing unit (CPU) 41, a memory 42, a storage device 43 such as a hard disk drive, a communication interface (abbreviated to IF) 44 configured to transmit and receive data to and from, for example, an external apparatus via a network, a user-interface (abbreviated to UI) device 45 including a touch panel or a combination of a liquid crystal display and a keyboard, and a print engine 46. These components are connected to each other by using a control bus 47.

The print engine 46 is configured to print an image on a sheet after performing processes such as charging, exposure, development, transfer, and fixing.

The CPU 41 is a processor that is configured to perform predetermined processing in accordance with a control program stored in the memory 42 or in the storage device 43 and that is configured to control operation of the image forming apparatus 10. Although the description in the present exemplary embodiment will be given on the assumption that the CPU 41 reads and executes the control program stored in the memory 42 or in the storage device 43, it is also possible to provide the CPU 41 with the program stored in a storage medium such as a compact-disc read-only memory (CD-ROM).

Figure 3:
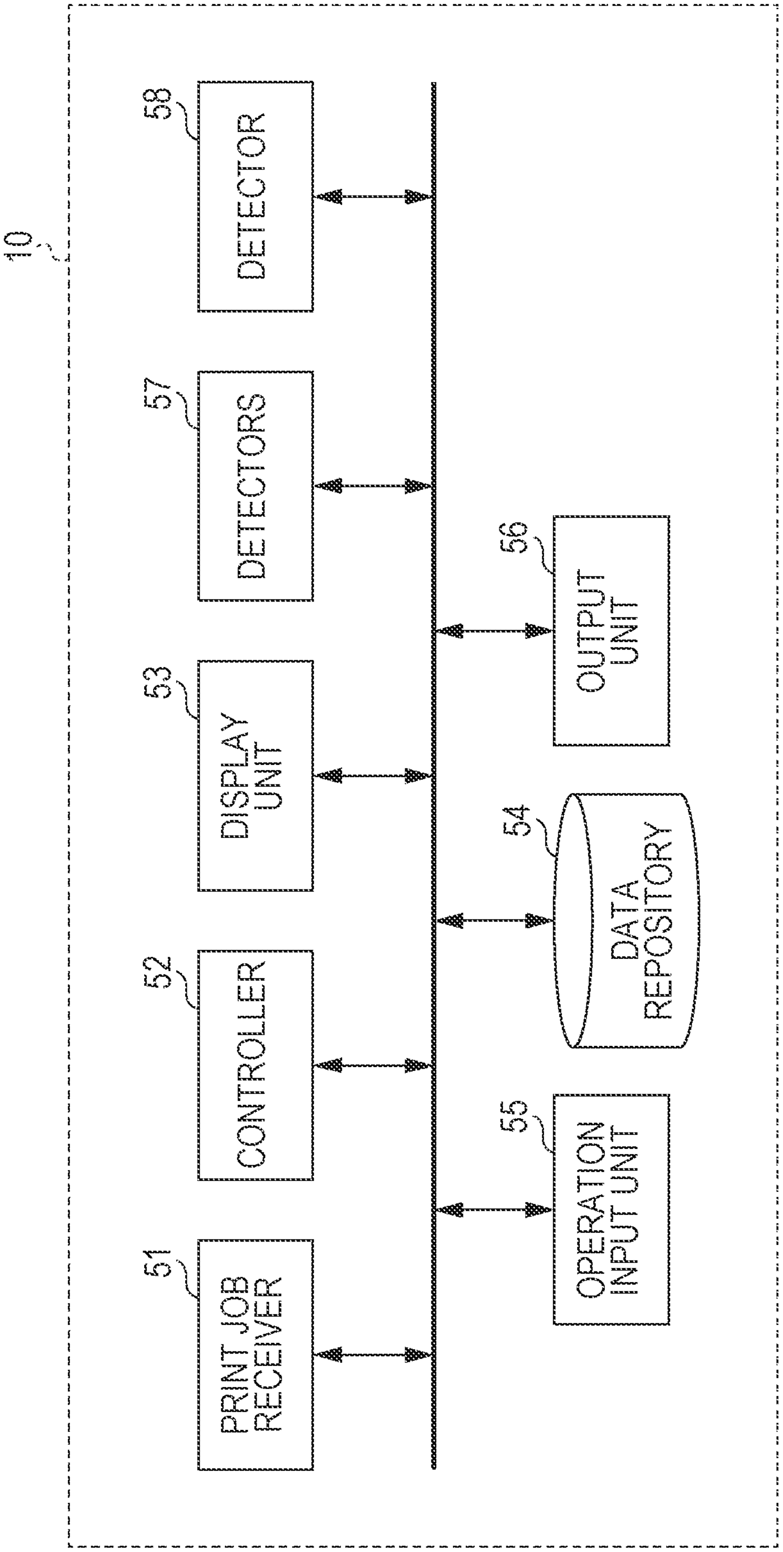
FIG. 3 is a block diagram depicting a functional configuration of the image forming apparatus according to the first exemplary embodiment.

FIG. 3 is a block diagram depicting a functional configuration of the image forming apparatus 10 implemented by the execution of the control program described above.

As depicted in FIG. 3, the image forming apparatus 10 according to the present exemplary embodiment includes a print job receiver 51, a controller 52, a display unit 53, a data repository 54, an operation input unit 55, an output unit 56, detectors 57, and a detector 58.

The print job receiver 51 is configured to receive a print job (an example of a print command) transmitted from a terminal apparatus (not depicted).

The controller 52 is configured to perform control to create image data, which is to become print data, in accordance with a print job received by the print job receiver 51 and is configured to cause the output unit 56 to output the created image data.

The data repository 54 is configured to store various kinds of data including the image data created by the controller 52.

The data repository 54 is also configured to store tray information of each of the sheet feeding trays 30. The tray information includes the priority with regard to sheet feeding and the sheet size for each of the sheet feeding trays 30. The information regarding the priority with regard to sheet feeding may be, for example, the information regarding the order of use that is set by a user for the sheet feeding trays or the order determined in advance for the image forming apparatus 10. If a print job does not include information specifying one of the sheet feeding trays 30, the image forming apparatus 10 selects one of the sheet feeding trays 30 in accordance with the priority and causes the selected sheet feeding tray 30 to feed a sheet. The information regarding the sheet size is the information regarding the size of the print media sheet P placed in each of the sheet feeding trays 30. The sheet size may be set by the user or may be acquired by a sheet sensor (not depicted) included in the image forming apparatus 10.

In accordance with the control by the controller 52, the output unit 56 operates as an image output unit configured to output an image on a print media sheet P.

The display unit 53 is controlled by the controller 52 and is configured to cause a display (not depicted) of the image forming apparatus 10 or a display screen of an apparatus such as a terminal apparatus to display various kinds of information. The operation input unit 55 is configured to receive information regarding various operations performed by the user, who uses the image forming apparatus 10.

Each of the detectors 57 has the function of detecting the state of the corresponding sheet feeding tray 30. The state of each sheet feeding tray 30 includes information such as whether the sheet feeding tray 30 has run out of print media sheets P and the status of the sheet feeding tray 30 with regard to the set-up stage for sheet feeding.

The detector 58 has the function of detecting whether the open/close covering 22 of the housing 20 is open or closed.

In addition, when sheets are used up during a print job, the controller 52 notifies the user of the absence of a sheet, for example, by using the display (not depicted) included in the image forming apparatus 10. Then, when the user supplies a sheet feeding tray 30 with one or more print media sheets P and closes the open/close covering 22, the controller 52 causes each of the detectors 57 to start monitoring the state of the corresponding sheet feeding tray 30. In this way, the detectors 57 are configured to detect the states of the sheet feeding trays 30, namely, whether each of the sheet feeding trays 30 has run out of print media sheets P and the status of the sheet feeding trays 30 with regard to the set-up stage for sheet feeding. Detection of the state of a sheet feeding tray 30 is performed for all of the sheet feeding trays 30 irrespective of the supply of a print media sheet P.

The controller 52 is configured to cause the sheet feeding tray 30 assigned the top priority (when appropriate, referred to as the "top-priority sheet feeding tray" below) to feed a sheet after the sheet feeding tray 30 is set up for sheet feeding and the state of the sheet feeding tray 30 is fixed, the top priority being highest among the priorities that are assigned to the multiple sheet feeding trays 30 with regard to sheet feeding and that are determined in advance. Specifically, when the state of the top-priority sheet feeding tray 30 is fixed, the controller 52 causes the top-priority sheet feeding tray 30 to feed a sheet even if the state of any one of the sheet feeding trays 30 is still unfixed.

The controller 52 is also configured to cause the detectors 57 to monitor the states of the multiple sheet feeding trays 30, select one or more sheet feeding trays 30 capable of feeding a sheet based on the states of the multiple sheet feeding trays 30, and determine the sheet feeding tray 30 to feed a sheet among the selected one or more sheet feeding trays 30 at least based on the priority and optionally based on the sheet size.

The controller 52 may also be configured to cause the sheet feeding tray 30 assigned the second highest priority (when appropriate, referred to as the "next sheet feeding tray" below) to feed a sheet when the top-priority sheet feeding tray 30 becomes empty during a sheet feeding job in which the sheet feeding trays 30 feed sheets. Specifically, if the print media sheets P housed in the multiple sheet feeding trays 30 are of the same type of paper and of the same size, the sheet feeding tray 30 assigned the second highest priority may be caused to feed a sheet when the top-priority sheet feeding tray 30 becomes empty. Further, if the print media sheets P housed in the multiple sheet feeding trays 30 are of different types of paper, the next sheet feeding tray 30 may be caused to feed a sheet, or the sheet feeding may be interrupted (that is, the print job may be interrupted) when the top-priority sheet feeding tray 30 becomes empty. The configuration of the sheet feeding tray 30 assigned the second highest priority continuing to feed a sheet when sheets are used up may be set by the user or may be set in advance. Such setting information is stored in the data repository 54. Further, if the print media sheets P housed in the multiple sheet feeding trays 30 are of different sizes, the next sheet feeding tray 30 may be caused to feed a sheet, or the sheet feeding may be interrupted (that is, the print job may be interrupted) when the top-priority sheet feeding tray 30 becomes empty. If the next sheet feeding tray 30 houses a print media sheet P of a smaller size, for example, an image size may be reduced for output.

In response to an external input, the controller 52 changes the priorities that are assigned to the sheet feeding trays 30 and that are stored in the data repository 54. Specifically, the user rewrites the information regarding the order of use of the sheet feeding trays 30 by using the operation input unit 55.

Figure 4:
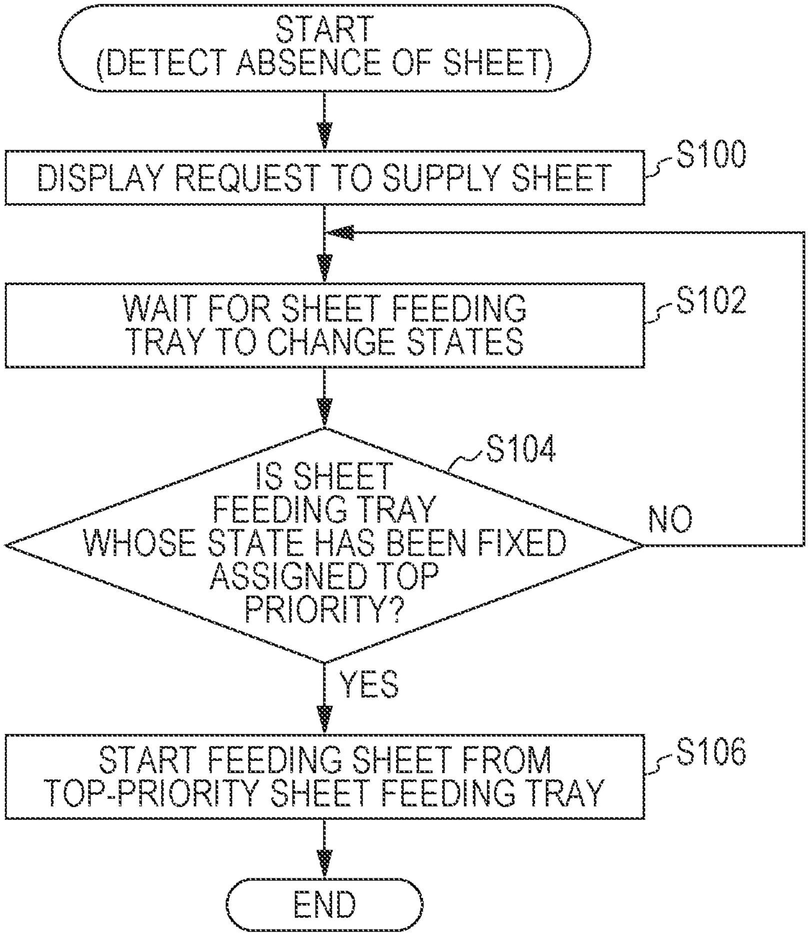
FIG. 4 is a flowchart depicting an operation of selecting a sheet feeding tray in a sheet feeder according to the first exemplary embodiment.

Next, an operation of selecting a sheet feeding tray 30 in the sheet feeder 12 will be described with reference to FIG. 4.

First, when the controller 52 detects the state in which one of the sheet feeding trays 30 has run out of print media sheets P during a print job, that is, detects that sheets are used up, the controller 52 causes the display of the image forming apparatus 10 or the display of the terminal apparatus to display a request to supply a print media sheet P (step S100).

When the user opens the open/close covering 22 after the request to supply a print media sheet P, power supply to the sheet feeder 12 is stopped. Then, when the user closes the open/close covering 22 after supplying one or more print media sheets P, power supply to the sheet feeder 12 is resumed. Each of the sheet feeding trays 30 enters the set-up stage for sheet feeding in response to the resumption of power supply to the sheet feeder 12. In addition, the detectors 57 resume monitoring the sheet feeding trays 30 in response to power supply to the sheet feeder 12. The controller 52 causes each of the detectors 57 to monitor the corresponding one of the multiple sheet feeding trays 30 and waits without selecting a sheet feeding tray 30 to start to feed a sheet until the state of one of the sheet feeding trays 30 is fixed, that is, one of the sheet feeding trays 30 finishes the set-up stage for sheet feeding and is ready to feed a sheet (step S102).

When the state of one of the sheet feeding trays 30 becomes fixed, that is, one of the sheet feeding trays 30 becomes ready to feed a sheet, it is determined whether the sheet feeding tray 30 whose state has been fixed is assigned the top priority (step S104). If the sheet feeding tray 30 whose state has been fixed is assigned the top priority, the process proceeds to step S106. In contrast, if the sheet feeding tray 30 whose state has been fixed is not assigned the top priority, the process returns to step S102, and the controller 52 waits for the state of another sheet feeding tray 30 to be fixed.

Figure 5:
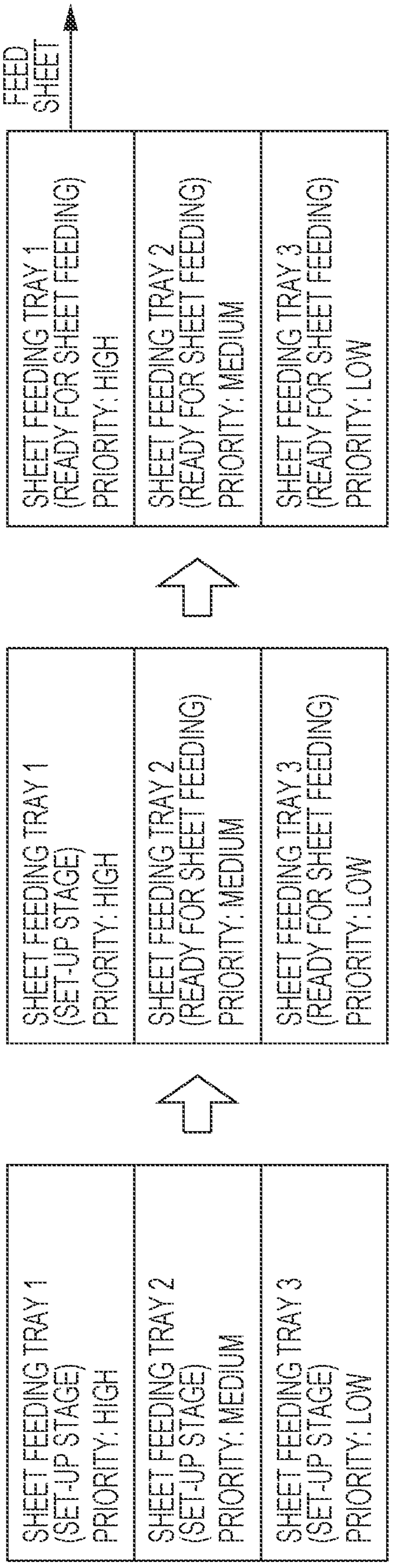
FIG. 5 is a diagram describing an operation of selecting a sheet feeding tray in the sheet feeder according to the first exemplary embodiment.

Step S104 will be described in more detail. FIG. 5 depicts a sheet feeder having three sheet feeding trays. The sheet feeding trays 1 to 3 house print media sheets P of the same type of paper and of the same size. The priority of the sheet feeding tray 1 is set to "high", the priority of the sheet feeding tray 2 is set to "medium", and the priority of the sheet feeding tray 3 is set to "low". The sheet feeding trays 1 to 3 enters the set-up stage for sheet feeding in response to simultaneous power supply to the sheet feeding trays 1 to 3. Subsequently, the states of the sheet feeding trays 2 and 3 become fixed. A sheet feeding tray is not selected and the waiting period continues at this time until the sheet feeding tray 1 becomes ready to feed a sheet because the sheet feeding trays 2 and 3 are assigned a lower priority than the sheet feeding tray 1, in other words, the sheet feeding tray 1 has priority over the sheet feeding trays 2 and 3. Subsequently, once the state of the sheet feeding tray 1 is fixed, the sheet feeding tray 1, which is assigned a higher priority as the sheet feeding tray to feed a sheet, is selected.

Figure 6:
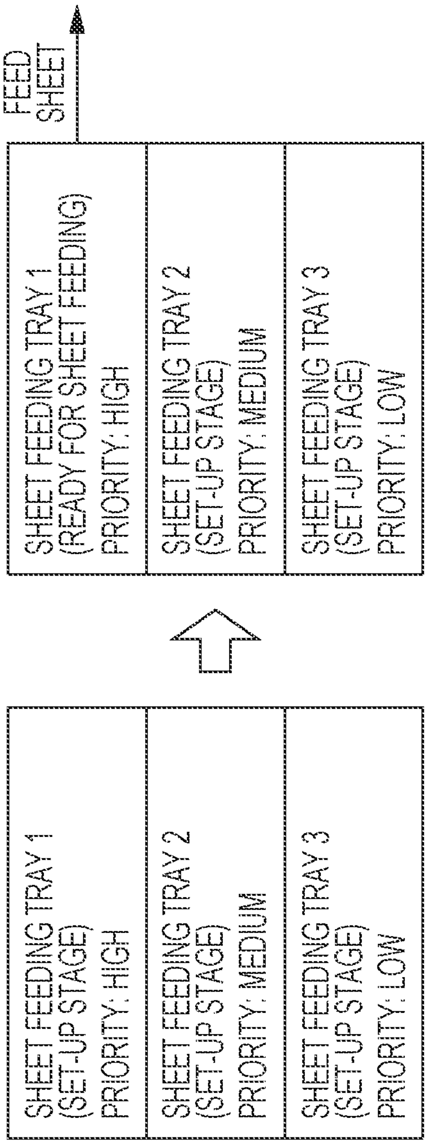
FIG. 6 is a diagram describing an operation of selecting a sheet feeding tray in the sheet feeder according to the first exemplary embodiment.

As depicted in FIG. 6, when the state of the sheet feeding tray 1, which has priority over the sheet feeding trays 2 and 3, is fixed earlier than the other sheet feeding trays, the sheet feeding tray 1, which is assigned a higher priority as the sheet feeding tray to feed a sheet, is selected before the state of the sheet feeding tray 2 or 3 is fixed.

The top-priority sheet feeding tray 30, whose state has been fixed, starts to feed a sheet to the image forming unit 16 in step S106.

In this way, the sheet feeding tray to feed a sheet is selected from the sheet feeding trays 30 when the print media sheets P are used up.

Then, the selected sheet feeding tray 30 feeds a print media sheet P to the image forming unit 16, and the print job, which is interrupted because of the absence of the print media sheet P, resumes.

Next, an effect according to the present exemplary embodiment will be described.

The controller 52 is configured to wait without selecting a sheet feeding tray until the sheet feeding tray 30 assigned the top priority with regard to sheet feeding, which is determined in advance, among the multiple sheet feeding trays 30 finishes the set-up stage for sheet feeding and the state is fixed in the present exemplary embodiment. The top-priority sheet feeding tray 30 is caused to feed a sheet after the state of the top-priority sheet feeding tray 30 is fixed. Accordingly, the sheet feeding tray 30 to feed a sheet can be controlled in comparison with the case where the priorities of multiple sheet feeding trays 30 with regard to sheet feeding are changed based on the states of the sheet feeding trays 30.

As depicted in FIG. 6, when the state of the top-priority sheet feeding tray 30 is fixed, the controller 52 causes the top-priority sheet feeding tray 30 to feed a sheet even if the state of any one of the sheet feeding trays 30 is still unfixed in the present exemplary embodiment. Accordingly, the waiting period required before the state of the sheet feeding tray 30 is fixed is short, and the sheet feeding speed is improved in comparison with the case where the top-priority sheet feeding tray 30 is caused to feed a sheet after the states of all the sheet feeding trays 30 are fixed.

Further, the controller 52 causes the sheet feeding tray 30 assigned the second highest priority to feed a sheet when the top-priority sheet feeding tray 30 becomes empty during a sheet feeding job in the present exemplary embodiment. Accordingly, sheets can continuously be fed in comparison with the case where sheet feeding is temporarily stopped to supply sheets to the sheet feeding tray 30 that has become empty during a sheet feeding job.

The controller 52 is configured to change the priorities stored in the memory 42 or in the storage device 43 in response to an external input in the present exemplary embodiment. Specifically, the controller 52 changes the priorities of the sheet feeding trays 30 based on an external input from the user. Accordingly, the sheet feeding tray 30 to feed a sheet can be controlled in comparison with the case where the priorities of the sheet feeding trays 30 with regard to sheet feeding cannot be changed by an external input.

The controller 52 is also configured to cause the detectors 57 to monitor the states of the multiple sheet feeding trays 30, select one or more sheet feeding trays 30 capable of feeding a sheet based on the states of the multiple sheet feeding trays 30, and determine the sheet feeding tray 30 to feed a sheet among the selected one or more sheet feeding trays 30 at least based on the priority and optionally based on the sheet size in the present exemplary embodiment. Accordingly, the number of occurrences for the sheet feeding trays 30 to be empty can be reduced in comparison with the case where a sheet feeding tray 30 to feed a sheet is selected based on the priority without one or more sheet feeding trays 30 capable of feeding a sheet being selected based on the states of the multiple sheet feeding trays 30.

In addition, the controller 52 is configured to cause each of the detectors 57 to start monitoring the state of the corresponding sheet feeding tray 30 when the open/close covering 22 is closed in the present exemplary embodiment. Accordingly, the waiting period for the sheet feeding trays 30 to feed a sheet can be reduced in comparison with the case where each of the sheet feeding trays 30 is fitted with an open/close sensor and the monitoring of the state starts when an open/close covering is closed.

Further, the image forming apparatus 10 according to the present exemplary embodiment is able to form an image on a print media sheet P that the user intends to use because the sheet feeder 12 described above is used in comparison with the case of using an sheet feeder configured to change the priorities of multiple sheet feeding trays 30 with regard to sheet feeding based on the states of the sheet feeding trays 30.

Second Exemplary Embodiment

The configurations of a sheet feeder and an image forming apparatus according to the second exemplary embodiment are the same as the configurations of the sheet feeder 12 and the image forming apparatus 10 according to the first exemplary embodiment except the operation performed by the controller 52 when a sheet feeding tray 30 makes a request for supply, and the description of such configurations will be omitted. Configurations that are the same as the configurations in the first exemplary embodiment are denoted by the same signs.

Figure 7:
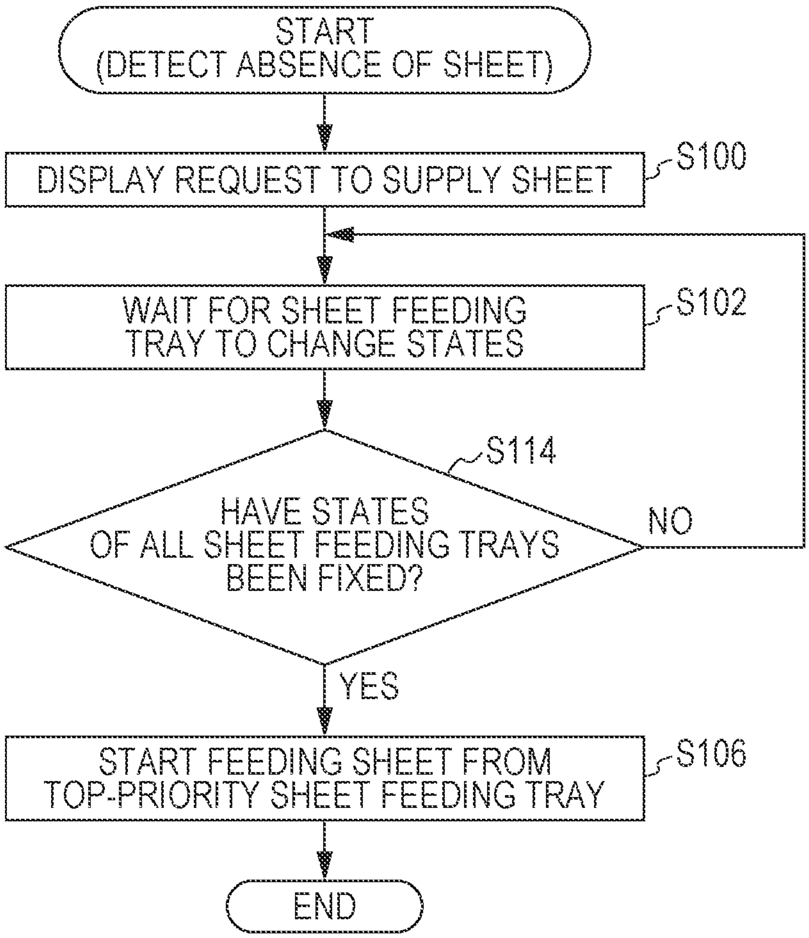
FIG. 7 is a flowchart depicting an operation of selecting a sheet feeding tray in a sheet feeder according to the second exemplary embodiment.

The controller 52 is configured to cause the top-priority sheet feeding tray 30 to feed a sheet after the states of all the sheet feeding trays 30 are fixed in the present exemplary embodiment. Specifically, as depicted in FIG. 7, in step S114, when the state of one of the sheet feeding trays 30 is fixed but there is another sheet feeding tray 30 whose state is unfixed, the process returns to step S102, and the controller 52 waits for the state of another sheet feeding tray 30 to be fixed. In contrast, when the states of all the sheet feeding trays 30 become fixed, the process proceeds to step S106, and the sheet feeding tray 30 assigned the top priority among all the sheet feeding trays 30 starts to feed a sheet.

Figure 8:
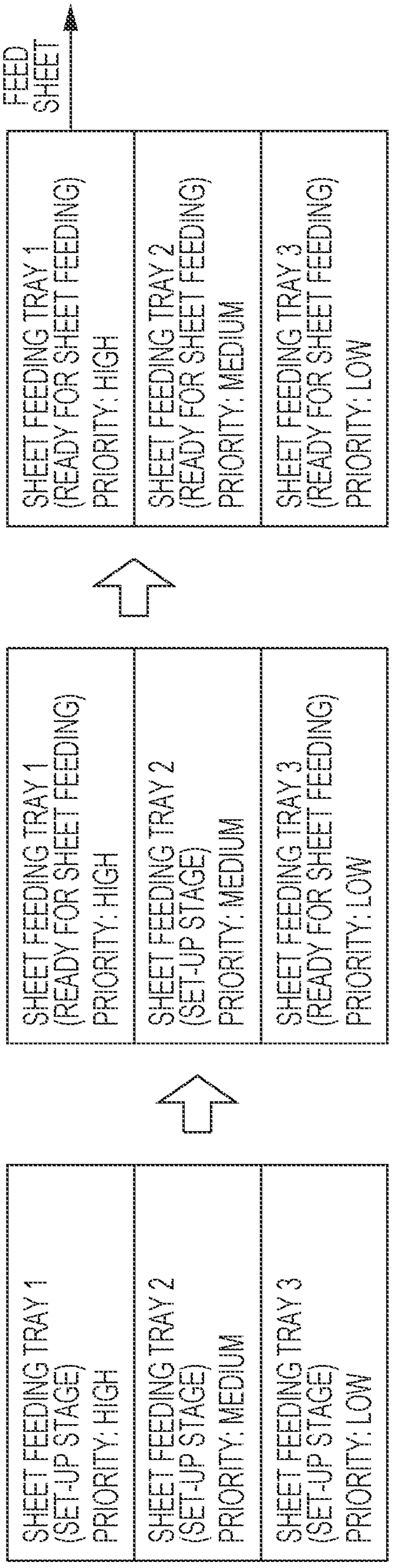
FIG. 8 is a diagram describing an operation of selecting a sheet feeding tray in the sheet feeder according to the second exemplary embodiment.

Next, step S114 will be described in more detail. FIG. 8 depicts a sheet feeder having three sheet feeding trays. The sheet feeding trays 1 to 3 house print media sheets P of the same type of paper and of the same size. The priority of the sheet feeding tray 1 is set to "high", the priority of the sheet feeding tray 2 is set to "medium", and the priority of the sheet feeding tray 3 is set to "low". The sheet feeding trays 1 to 3 enters the set-up stage for sheet feeding in response to simultaneous power supply to the sheet feeding trays 1 to 3. Subsequently, the states of the sheet feeding trays 1 and 3 become fixed. Although the sheet feeding tray 1 is assigned a higher priority than the sheet feeding tray 2, whose state is unfixed, in other words, the sheet feeding tray 1 has priority over the sheet feeding tray 2, a sheet feeding tray to feed a sheet is not selected, and the waiting period continues until the sheet feeding trays 1 to 3 become ready to feed a sheet. Subsequently, once the states of all the sheet feeding trays are fixed, the sheet feeding tray 1, which is assigned a higher priority as the sheet feeding tray to feed a sheet, is selected.

Next, an effect according to the present exemplary embodiment will be described. Description will be omitted as appropriate with regard to an effect similar to the effect obtained in the first exemplary embodiment.

As described above, since the controller 52 causes the top-priority sheet feeding tray 30 to feed a sheet after the states of all of the multiple sheet feeding trays 30 are fixed, a sheet feeding tray that is assigned a lower priority and whose state has been fixed is prevented from starting to feed a sheet before the state of a sheet feeding tray assigned a higher priority is fixed, and the top-priority sheet feeding tray 30 can feed a sheet in the present exemplary embodiment.

Third Exemplary Embodiment

The configurations of a sheet feeder and an image forming apparatus according to the third exemplary embodiment are the same as the configurations of the sheet feeder 12 and the image forming apparatus 10 according to the first exemplary embodiment except the operation performed by the controller 52 when a sheet feeding tray 30 makes a request for supply, and the description of such configurations will be omitted. Configurations that are the same as the configurations in the first exemplary embodiment are denoted by the same signs.

Figure 9:
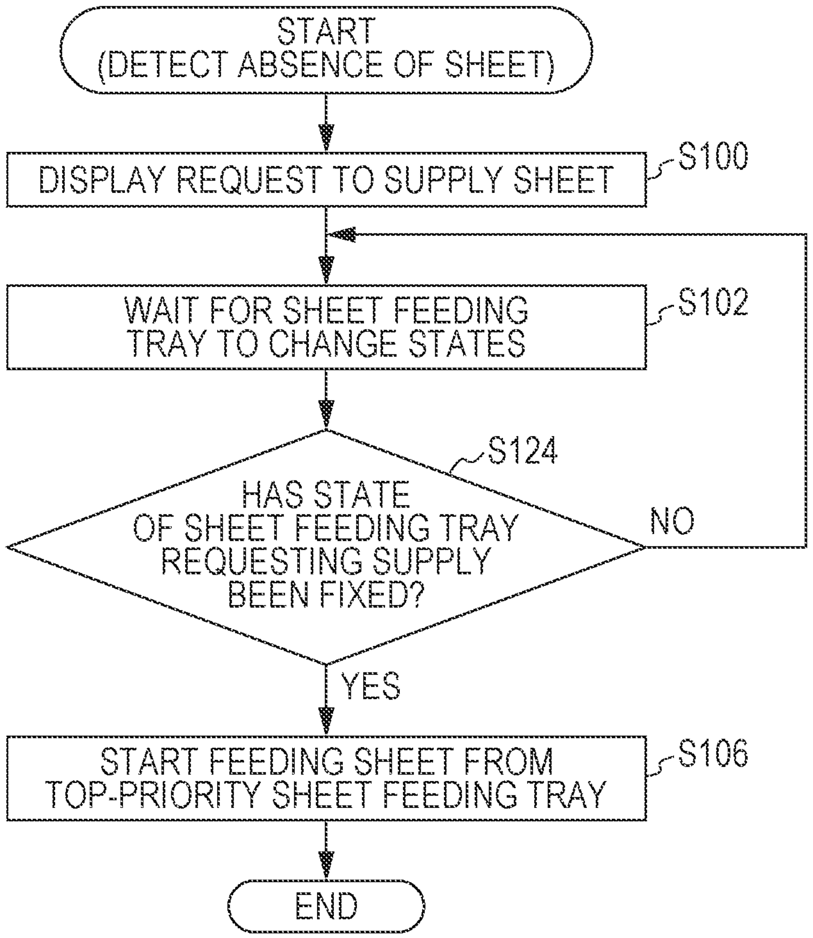
FIG. 9 is a flowchart depicting an operation of selecting a sheet feeding tray in a sheet feeder according to the third exemplary embodiment.

The controller 52 is configured to cause the top-priority sheet feeding tray 30 to feed a sheet after the states of one or more sheet feeding trays 30 making a request to supply a print media sheet P are fixed in the present exemplary embodiment. Specifically, as depicted in FIG. 9, when the states of one or more sheet feeding trays 30 requesting supply are unfixed, the waiting period continues in step S124 even when the state of a sheet feeding tray 30 assigned a higher priority than the one or more sheet feeding trays 30 requesting supply is fixed. In contrast, when the states of the one or more sheet feeding trays 30 requesting supply are fixed, the process proceeds to step S106 and the sheet feeding tray 30 assigned the top priority starts to feed a sheet.

Figure 10:
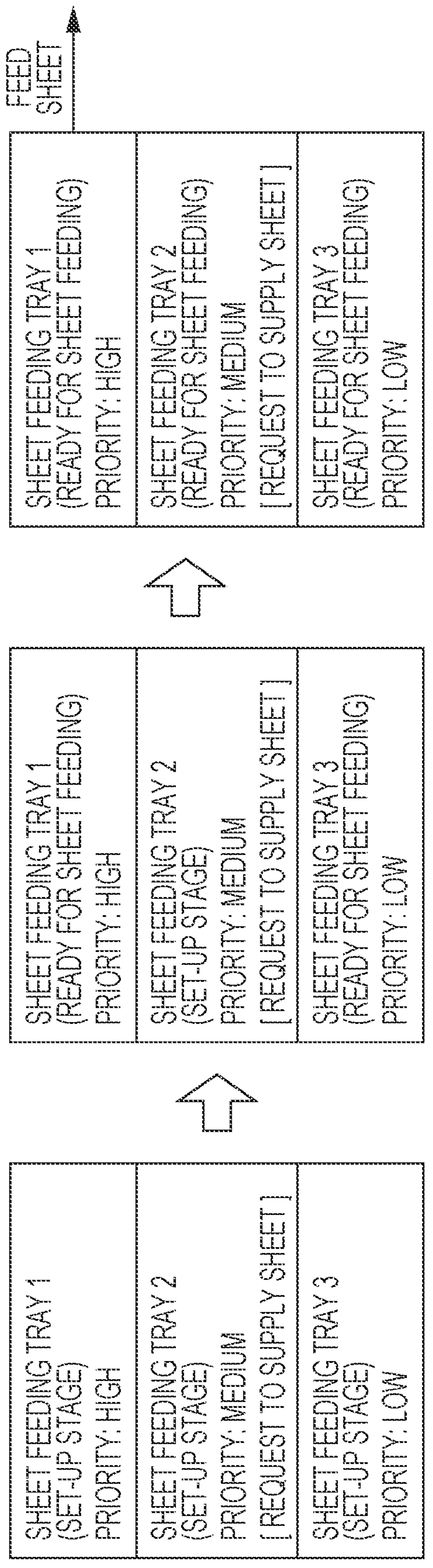
FIG. 10 is a diagram describing an operation of selecting a sheet feeding tray in the sheet feeder according to the third exemplary embodiment.

Next, step S124 will be described in more detail. FIG. 10 depicts a sheet feeder having three sheet feeding trays. The sheet feeding trays 1 to 3 house print media sheets P of the same type of paper and of the same size. The priority of the sheet feeding tray 1 is set to "high", the priority of the sheet feeding tray 2 is set to "medium", and the priority of the sheet feeding tray 3 is set to "low". The sheet feeding tray 2 is requesting supply. The sheet feeding trays 1 to 3 enters the set-up stage for sheet feeding in response to simultaneous power supply to the sheet feeding trays 1 to 3. Subsequently, the states of the sheet feeding trays 1 and 3 become fixed. Although the sheet feeding tray 1 is assigned a higher priority than the sheet feeding tray 2, whose state is unfixed, in other words, the sheet feeding tray 1 has priority over the sheet feeding tray 2, a sheet feeding tray to feed a sheet is not selected, and the waiting period continues until the sheet feeding tray 2 becomes ready to feed a sheet. Subsequently, once the state of the sheet feeding tray 2 is fixed, the sheet feeding tray 1, which is assigned a higher priority as the sheet feeding tray to feed a sheet, is selected.

If the state of the sheet feeding tray 3 is fixed last of all, the sheet feeding tray 1 may start to feed a sheet before the state of the sheet feeding tray 3 is fixed.

Next, an effect according to the present exemplary embodiment will be described. Description will be omitted as appropriate with regard to an effect similar to the effect obtained in the first exemplary embodiment.

As described above, since the top-priority sheet feeding tray 30 is caused to feed a sheet after the states of the one or more sheet feeding trays 30 making a request to supply a print media sheet P are fixed, a sheet feeding tray 30 to feed a sheet can be controlled in the present exemplary embodiment in comparison with the case where a sheet is fed before the states of the one or more sheet feeding trays 30 making a request to supply a print media sheet P are fixed.

Other Exemplary Embodiments

Although the single open/close covering 22 is configured to cover the sheet feeder 12 and the image forming unit 16 both in the exemplary embodiments described above, the present disclosure is not limited to this configuration. For example, open/close coverings may be separately disposed at positions corresponding to the sheet feeder 12 and the image forming unit 16 in the housing 20. In such a case, the open/close covering corresponding to the sheet feeder 12 functions as the open/close covering 22.

Although the housing 20 includes the open/close covering 22 in the exemplary embodiments described above, the present disclosure is not limited to this configuration, and the housing 20 does not need to include the open/close covering 22. In such a case, each of the sheet feeding trays 30 may be fitted with an open/close sensor, which is a detector to detect opening and closing, and the state of each of the sheet feeding trays 30 may be acquired based on the information obtained from the open/close sensor.

Although the sheet feeder 12 and the image forming unit 16 are housed in the housing 20 in the exemplary embodiments described above, the present disclosure is not limited to this configuration. For example, the sheet feeder 12 and the image forming unit 16 may be housed in separate housings.

In the control mode according to the first exemplary embodiment (referred to as the "first control mode" as appropriate below), the controller 52 is configured to cause the top-priority sheet feeding tray 30 to feed a sheet when the state of the top-priority sheet feeding tray 30 is fixed even if the state of any one of the sheet feeding trays 30 is still unfixed. In the control mode according to the second exemplary embodiment (referred to as the "second control mode" as appropriate below), the controller 52 is configured to cause the top-priority sheet feeding tray 30 to feed a sheet after the states of all the multiple sheet feeding trays 30 are fixed. In the control mode according to the third exemplary embodiment (referred to as the "third control mode" as appropriate below), the controller 52 is configured to cause the top-priority sheet feeding tray 30 to feed a sheet after the states of one or more sheet feeding trays 30 making a request to supply a print media sheet P are fixed. The present disclosure is not limited to these exemplary embodiments. For example, switching between the control modes may be allowed. Specifically, a program containing two or more of the first, second, and third control modes may be stored in the memory 42 or in the storage device 43, and the user may be allowed to select any control mode from the multiple control modes stored in the memory 42 or in the storage device 43 and may be allowed to switch between the control modes. Such a configuration allows the user to freely select any control mode from the multiple control modes.

The present disclosure is not limited to the exemplary embodiments described above, and various modifications, changes, and improvements are feasible without departing from the scope of the disclosure. For example, the modifications described above may be combined as appropriate and implemented.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

A sheet feeder comprising:

a plurality of sheet feeding trays each configured to house one or more print media sheets; and a processor configured to:

cause a sheet feeding tray assigned a top priority to feed a print media sheet after the sheet feeding tray is set up for sheet feeding and a state of the sheet feeding tray is fixed, the top priority being highest among priorities that are assigned to the plurality of sheet feeding trays and that are determined in advance with regard to sheet feeding.

(((2)))

The sheet feeder according to (((1))), wherein the processor is configured to:

when the state of the sheet feeding tray assigned the top priority is fixed, cause the sheet feeding tray assigned the top priority to feed a print media sheet even if a state of any one of the plurality of sheet feeding trays is still unfixed.

(((3)))

The sheet feeder according to (((2))), wherein the processor is configured to:

cause a sheet feeding tray assigned a second highest priority to feed a print media sheet when the sheet feeding tray assigned the top priority becomes empty during a sheet feeding job.

(((4)))

The sheet feeder according to (((1))), wherein the processor is configured to:

cause the sheet feeding tray assigned the top priority to feed a print media sheet after states of the plurality of sheet feeding trays are all fixed.

(((5)))

The sheet feeder according to (((1))), wherein the processor is configured to:

cause the sheet feeding tray assigned the top priority to feed a print media sheet after states of one or more of the plurality of sheet feeding trays are fixed, the one or more sheet feeding trays requesting supply of the print media sheet.

(((6)))

The sheet feeder according to any one of (((1))) to (((5))), further comprising:

a memory configured to store priorities assigned to the plurality of sheet feeding trays with regard to sheet feeding, wherein the processor is configured to:

change the priorities stored in the memory in response to an external input.

(((7)))

The sheet feeder according to any one of (((1))) to (((6))), wherein the processor is configured to:

monitor a state of each of the plurality of sheet feeding trays by using a corresponding sensor, select one or more of the plurality of sheet feeding trays in accordance with the states of the plurality of sheet feeding trays, the one or more sheet feeding trays being capable of feeding a print media sheet, and determine a sheet feeding tray to feed a print media sheet among the selected one or more sheet feeding trays at least based on the assigned priority and optionally based on a size of the print media sheet.

(((8)))

The sheet feeder according to any one of (((1))) to (((7))), further comprising:

a covering configured to cover the plurality of sheet feeding trays from outside, wherein the processor is configured to:

start to monitor the state of each of the plurality of sheet feeding trays by using a corresponding sensor when the covering is closed.

(((9)))

An image forming apparatus comprising:

the sheet feeder according to any one of (((1))) to (((8))); and an image forming unit configured to form an image on a print media sheet fed from the sheet feeder.

What is claimed is:

1. A sheet feeder comprising:

a plurality of sheet feeding trays each configured to house one or more print media sheets;

a processor configured to:

cause a sheet feeding tray assigned a top priority to feed a print media sheet after the sheet feeding tray is set up for sheet feeding and a state of the sheet feeding tray is fixed, the top priority being highest among priorities that are assigned to the plurality of sheet feeding trays and that are determined in advance with regard to sheet feeding; and a covering configured to cover the plurality of sheet feeding trays from outside, wherein the processor is configured to:

start to monitor the state of each of the plurality of sheet feeding trays by using a corresponding sensor when the covering is closed.

2. The sheet feeder according to claim 1, wherein the processor is configured to:

when the state of the sheet feeding tray assigned the top priority is fixed, cause the sheet feeding tray assigned the top priority to feed a print media sheet even if a state of any one of the plurality of sheet feeding trays is still unfixed.

3. The sheet feeder according to claim 2, wherein the processor is configured to:

cause a sheet feeding tray assigned a second highest priority to feed a print media sheet when the sheet feeding tray assigned the top priority becomes empty during a sheet feeding job.

4. The sheet feeder according to claim 1, wherein the processor is configured to:

cause the sheet feeding tray assigned the top priority to feed a print media sheet after states of the plurality of sheet feeding trays are all fixed.

5. The sheet feeder according to claim 1, wherein the processor is configured to:

cause the sheet feeding tray assigned the top priority to feed a print media sheet after states of one or more of the plurality of sheet feeding trays are fixed, the one or more sheet feeding trays requesting supply of the print media sheet.

6. The sheet feeder according to claim 1, further comprising:

a memory configured to store priorities assigned to the plurality of sheet feeding trays with regard to sheet feeding, wherein the processor is configured to:

change the priorities stored in the memory in response to an external input.

7. The sheet feeder according to claim 1, wherein the processor is configured to:

select one or more of the plurality of sheet feeding trays in accordance with the states of the plurality of sheet feeding trays, the one or more sheet feeding trays being capable of feeding a print media sheet, and determine a sheet feeding tray to feed a print media sheet among the selected one or more sheet feeding trays at least based on the assigned priority and optionally based on a size of the print media sheet.

8. An image forming apparatus comprising:

the sheet feeder according to claim 1; and an image forming unit configured to form an image on a print media sheet fed from the sheet feeder.

9. An image forming apparatus comprising:

the sheet feeder according to claim 2; and an image forming unit configured to form an image on a print media sheet fed from the sheet feeder.

10. An image forming apparatus comprising:

the sheet feeder according to claim 3; and an image forming unit configured to form an image on a print media sheet fed from the sheet feeder.

11. An image forming apparatus comprising:

the sheet feeder according to claim 4; and an image forming unit configured to form an image on a print media sheet fed from the sheet feeder.

12. An image forming apparatus comprising:

the sheet feeder according to claim 5; and an image forming unit configured to form an image on a print media sheet fed from the sheet feeder.

13. An image forming apparatus comprising:

the sheet feeder according to claim 6; and an image forming unit configured to form an image on a print media sheet fed from the sheet feeder.

14. An image forming apparatus comprising:

the sheet feeder according to claim 7; and an image forming unit configured to form an image on a print media sheet fed from the sheet feeder.

15. A non-transitory computer readable medium storing a program causing a computer to execute a process for controlling a plurality of sheet feeding trays each configured to house one or more print media sheets, the process comprising:

causing a sheet feeding tray assigned a top priority to feed a print media sheet after the sheet feeding tray is set up for sheet feeding and a state of the sheet feeding tray is fixed, the top priority being highest among priorities that are assigned to the plurality of sheet feeding trays and that are determined in advance with regard to sheet feeding; and starting to monitor the state of each of the plurality of sheet feeding trays by using a corresponding sensor when a covering, which covers the plurality of sheet feeding trays from outside, is closed.

16. A sheet feeder comprising:

a plurality of sheet feeding trays each configured to house one or more print media sheets;

means for causing a sheet feeding tray assigned a top priority to feed a print media sheet after the sheet feeding tray is set up for sheet feeding and a state of the sheet feeding tray is fixed, the top priority being highest among priorities that are assigned to the plurality of sheet feeding trays and that are determined in advance with regard to sheet feeding; and a covering configured to cover the plurality of sheet feeding trays from outside,
wherein the means is configured to:
start to monitor the state of each of the plurality of sheet feeding trays by using a corresponding sensor when the covering is closed.

* * * * *